(12) United States Patent
Takahashi et al.

(10) Patent No.: US 7,180,271 B2
(45) Date of Patent: Feb. 20, 2007

(54) VEHICLE GENERATOR REGULATING APPARATUS

(75) Inventors: Keiji Takahashi, Kariya (JP); Hirokazu Toyoda, Nukata-gun (JP)

(73) Assignee: Denso Corporation, Kariya (JP)

( * ) Notice: Subject to any disclaimer, the term of this patent is extended or adjusted under 35 U.S.C. 154(b) by 144 days.

(21) Appl. No.: 11/113,194

(22) Filed: Apr. 25, 2005

(65) Prior Publication Data

US 2005/0237687 A1   Oct. 27, 2005

(30) Foreign Application Priority Data

Apr. 23, 2004   (JP) .............................. 2004-128975

(51) Int. Cl.
*H02P 9/00* (2006.01)
*H02P 9/10* (2006.01)

(52) U.S. Cl. .............................. 322/28; 322/37; 322/99

(58) Field of Classification Search .................. 322/20, 322/24, 25, 27, 28, 37, 99; 320/148
See application file for complete search history.

(56) References Cited

U.S. PATENT DOCUMENTS

| | | | |
|---|---|---|---|
| 4,831,322 A | | 5/1989 | Mashino et al. |
| 4,973,896 A | * | 11/1990 | Shiga et al. ................... 322/28 |
| 5,210,480 A | | 5/1993 | Iwatani et al. |
| 5,256,959 A | * | 10/1993 | Nagano et al. ................ 322/25 |
| 5,448,154 A | * | 9/1995 | Kanke et al. .................. 322/28 |
| 6,215,284 B1 | * | 4/2001 | Komurasaki et al. .......... 322/25 |
| 6,271,649 B1 | * | 8/2001 | Iwatani ......................... 322/29 |
| 6,462,517 B2 | * | 10/2002 | Asada ........................... 322/28 |
| 6,707,275 B2 | | 3/2004 | Okahara et al. |
| 6,734,653 B2 | * | 5/2004 | Taniguchi et al. ............. 322/24 |
| 7,015,594 B2 | * | 3/2006 | Asada ....................... 290/40 R |
| 2002/0003418 A1 | | 1/2002 | Taniguchi et al. |
| 2002/0027426 A1 | | 3/2002 | Okahara et al. |

FOREIGN PATENT DOCUMENTS

| | | |
|---|---|---|
| JP | A 05-276799 | 10/1993 |
| JP | B2 7-106038 | 11/1995 |
| JP | B2 3019377 | 1/2000 |
| JP | A 2002-119098 | 4/2002 |

* cited by examiner

*Primary Examiner*—Nicholas Ponomarenko
(74) *Attorney, Agent, or Firm*—Oliff & Berridge, PLC (57) ABSTRACT

The vehicle generator regulating apparatus includes a switching device operating to allow a field current to flow into a field coil of the vehicle generator from a vehicle battery when applied with a voltage signal, a drive circuit applying the voltage signal to the switching device when supplied with a control signal, and a control circuit supplying the control signal to the drive circuit when the output voltage is detected to be not above a predetermined voltage. The drive circuit includes a charge pump circuit stepping up a DC voltage supplied from the battery to generate the voltage signal by repeatedly performing a cycle of charging and discharging multiple capacitors in synchronization with an oscillation signal from an oscillator circuit. The drive circuit is configured to lower the frequency of the oscillation signal when the vehicle generator is in a low power output state.

10 Claims, 4 Drawing Sheets

VEHICLE GENERATOR REGULATING APPARATUS

CROSS-REFERENCE TO RELATED APPLICATION

This application is related to Japanese Patent Application No. 2004-128975 filed on Apr. 23, 2004, the contents of which are hereby incorporated by reference.

BACKGROUND OF THE INVENTION

1. Field of the Invention

The present invention relates to a vehicle generator regulating apparatus that controls an output voltage of a vehicle generator.

2. Description of Related Art

Japanese Patent Application Laid-open No. 2002-119098 discloses a regulator for a vehicle generator, which is constituted by a voltage detector circuit, a voltage step-up circuit, and a switching device including a MOS transistor that operates for controlling a field current flowing thorough a field coil of the vehicle generator. The drain of the MOS transistor is connected to an output terminal of the vehicle generator and a positive terminal of a battery being charged by the vehicle generator. The source of the MOS transistor is connected to an end of the field coil. The other end of the field coil is grounded to a vehicle body.

The voltage detector circuit, whose input terminal is connected to the positive terminal of the battery and whose output terminal is connected to the voltage step-up circuit, detects the output voltage of the battery, and produces a drive signal (on/off signal) used for turning on and off the MOS transistor in order to keep the output voltage of the battery at a predetermined value.

The voltage step-up circuit, which is constituted by an oscillator circuit and a charge-pump circuit, produces a high voltage to be applied to a gate of the MOS transistor on the basis of the drive signal received from the voltage detector circuit. The charge-pump circuit performs repeatedly a cycle of charging and discharging multiple capacitors thereof by use of an oscillation signal (periodic pulse signal) outputted from the oscillator circuit for stepping up an input voltage applied thereto and applying the stepped-up voltage to the gate of the MOS transistor.

If the output voltage of the battery falls below the predetermined value, the voltage detector circuit outputs the on signal (drive signal) to the voltage step-up circuit. The charge pump circuit of the voltage step-up circuit, upon receiving the on signal, starts the cycle of charging and discharging the multiple capacitors, thereby applying the high voltage to the gate of the MOS transistor to turn on the MOS transistor. In consequence, the field current starts to flow through the field coil, so that the vehicle generator starts its power generation operation to charge the battery. As a result, the output voltage of the battery increases.

On the other hand, if the output voltage of the battery exceeds the predetermined voltage, the voltage detector circuit outputs the off signal (drive signal) to the voltage step-up circuit. The charge pump circuit of the voltage step-up circuit, upon receiving the off signal, ceases the cycle of charging and discharging the multiple capacitors. As a result, the output voltage of the charge pump decreases rapidly, and the MOS transistor is turned off. In consequence, the field current flowing through the field coil is interrupted, and the vehicle generator stops the power generation operation. As a result, the output voltage of the battery decreases, because the battery is supplying electric power to electric loads.

Through these operations repeatedly performed by the regulator, the output voltage of the battery can be kept at the predetermined value.

In such a regulator, it is necessary for the charge-pump circuit to quickly build up its output voltage so that the MOS transistor can well respond to the drive signal which the voltage detector circuit outputs. The frequency of the oscillation signal (periodic pulse signal) is set at a relatively high frequency, because the build-up speed of the output voltage of the charge pump circuit increases with increase of the frequency of the oscillation signal which is outputted from the oscillator circuit.

Incidentally, a high frequency current resulting from the charging and discharging the multiple capacitors flows into the battery as a noise current. The frequency of the noise current increases with the increase of the frequency of the oscillation signal which the oscillator circuit outputs. Accordingly, if the frequency of the oscillation signal is set at a high value, the chance of the electric loads supplied with electric power from the battery being affected by this noise current becomes high.

SUMMARY OF THE INVENTION

The vehicle generator regulating apparatus of the invention has a structure including:

a switching device operating to allow a field current to flow into a field coil of the vehicle generator from a battery being charged by the vehicle generator when the switching device is applied with a voltage signal;

a drive circuit applying the voltage signal to the switching device when the drive circuit is supplied with a control signal; and a control circuit detecting an output voltage of the battery and supplying the control signal to the drive circuit when the output voltage is detected to be not above a predetermined voltage;

the drive circuit including a charge pump circuit stepping up a DC voltage supplied from the battery to generate the voltage signal by repeatedly performing a cycle of charging and discharging a plurality of capacitors in synchronization with an oscillation signal, and an oscillator circuit supplying the oscillation signal to the charge pump circuit, the drive circuit being configured to lower a frequency of the oscillation signal when the vehicle generator is in a low power output state.

With this structure, the energy of the noise current caused by charging and discharging the capacitors of the charge pump circuit can be reduced by lowering the frequency of the oscillation signal.

Although lowering the frequency of the oscillation signal increases a power loss at the switching device such as a FET (Field-Effect Transistor) in a transient state, the power loss is small, because the lowering of the frequency of the oscillation signal takes place only when the vehicle generator is in a low power output state and the field current passing through the FET is therefore small.

The drive circuit may include a field current detector circuit detecting an intensity of the field current, and the drive circuit may be configured to lower the frequency of the oscillation signal when the field current detector circuit detects that the intensity of the field current is not above a predetermined intensity.

The drive circuit may include an on-time measuring circuit which measures, as an on-time, a duration of a time during which the switching device is in an on state where the field current is allowed to flow into the field coil, and the drive circuit may be configured to lower the frequency of the oscillation signal when the on-time measuring circuit detects that the on-time is not longer than a predetermined time.

The drive circuit may include an induced voltage detector circuit which detects a voltage induced across the stator coil, and the drive circuit may be configured to lower the frequency of the oscillation signal when the induced voltage detector circuit detects that the value of the voltage induced across the stator coil is not larger than a predetermined value.

The oscillator circuit may include a first oscillating circuit generating a first periodic pulse signal having a first frequency, and a second oscillating circuit generating a second periodic pulse signal having a second frequency lower than the first frequency.

The second oscillating circuit may be constituted by a frequency-divider circuit which frequency-divides the first periodic pulse signal to produce the second periodic pulse signal.

PREFERRED EMBODIMENTS OF THE INVENTION

First Embodiment

Figure 1:
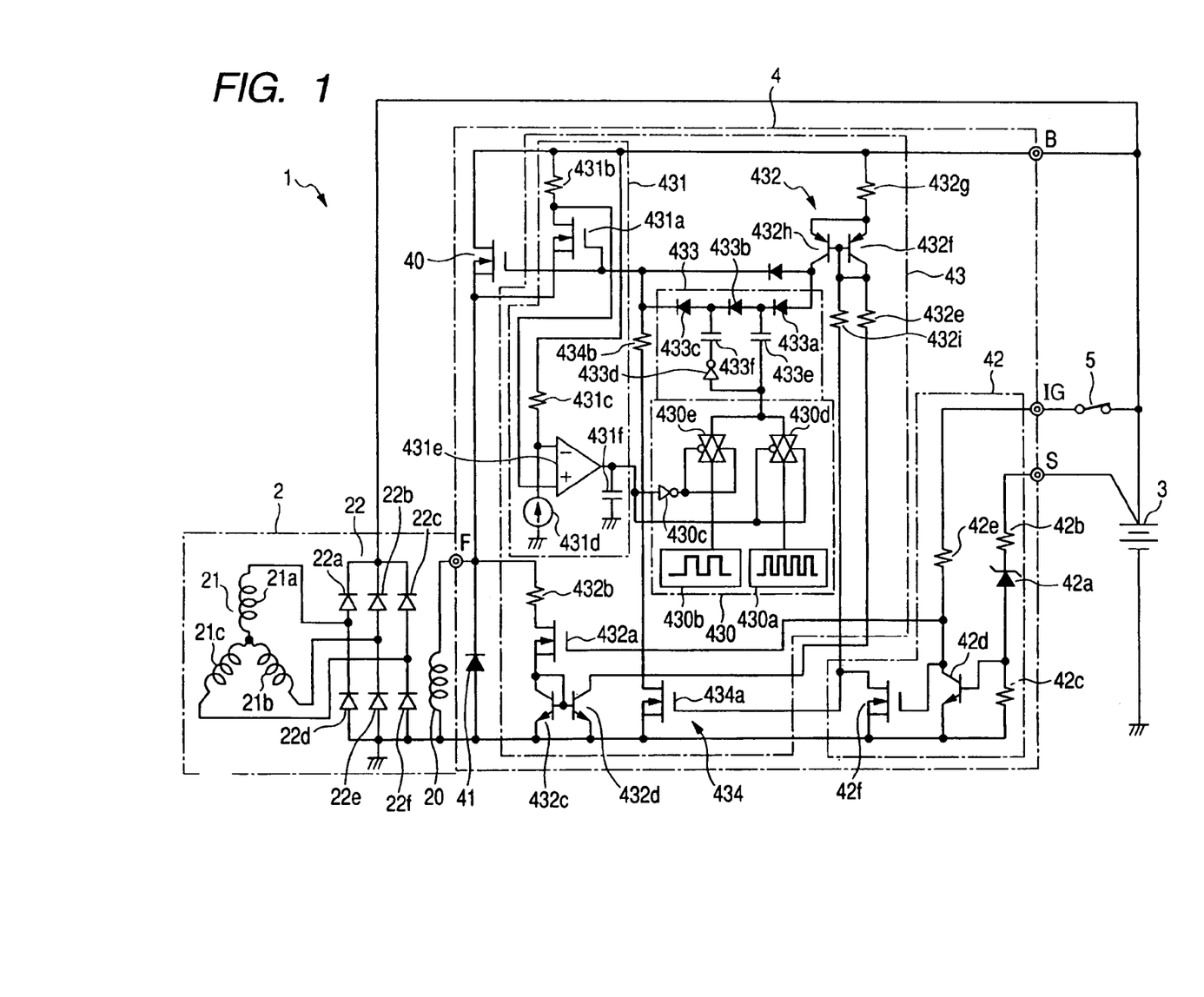
FIG. 1 is a circuit diagram of a vehicle battery charging apparatus including a vehicle generator regulating apparatus according to a first embodiment of the invention.

FIG. 1 is a circuit diagram of a vehicle battery charging apparatus 1 including a vehicle generator regulating apparatus according to a first embodiment of the invention.

As shown in this figure, the vehicle battery charging apparatus 1 is constituted by a vehicle generator 2, a battery (DC voltage source) 3 whose rated output voltage is 14V, for example, and a regulator (vehicle generator regulating apparatus) 4.

The vehicle generator 2, which includes a field coil 20, a stator coil 21 and a rectifier circuit 22, generates a DC voltage by being driven by a belt (not shown) stretched between a vehicle engine and the vehicle generator 2.

The field coil 20 is wound around a rotor core (not shown) that is driven to rotate by a driving force from the engine. The field coil 20 is electrically connected to the regulator 4 through a slip ring (not shown) at one end thereof, and grounded to the vehicle body at the other end thereof.

The stator coil 21, which is constituted by Y-connected three phase coils 21a, 21b and 21c, generates a three-phase AC voltage when the field current flows through the field coil 20, and accordingly a magnetic flux which the rotating field coil 20 generates passes through these phase coils 21a, 21b and 21 c. The three-phase AC voltage generated by the stator coil 21 is supplied to the rectifier circuit 22. The rectifier circuit 22, which is constituted by 6 diodes 22a to 22f that are three-phase bridge connected, converts the three-phase AC voltage into a DC voltage by full-wave rectifying the three-phase AC voltage.

The cathodes of the diodes 22a to 22c are connected to the positive terminal of the battery 3, and the anodes of the diodes 22d to 22f are grounded to the vehicle body. The positive terminal of the battery 3 is also connected to an IG terminal of the regulator 4 through an ignition switch 5, and to B and S terminals of the regulator 4. The negative terminal of the battery is grounded to the vehicle body.

The regulator 4 is constituted by a field-effect transistor (referred to as a FET hereinafter) 40, a free wheel diode 41, a control circuit 42 and a drive circuit 43.

The FET 40 serves as a switching device for controlling the flow of the field current flowing into the field coil 20 of the vehicle generator 2. The drain of the FET 40 is connected to the positive terminal of the battery through the B terminal. The source of the FET 40 is connected to one end of the field coil 20 of the vehicle generator 2 thorough an F terminal of the regulator 4. The gate of the FET 40 is connected to the output of a charge pump circuit included in the drive circuit 43.

The free wheel diode 41 is for allowing a freewheel current, which is caused by a high voltage induced across the field coil 20 at the instant when the FET 40 is turned off, to flow. The cathode of the free wheel diode 41 is connected to the node of the source of the FET 40 and the one end of the field coil 20. The anode of the free wheel diode 41 is grounded to the vehicle body.

The control circuit 42, which is constituted by a Zener diode 42a, resistors 42b, 42c, 42e, a bipolar transistor 42d, and a FET 42f, is for detecting a voltage at the positive terminal of the battery 3, and outputting a control signal used for driving the FET 40 in order that the voltage of the positive terminal of the battery 3 is kept at 14V. The cathode of the Zener diode 42a is connected to the S terminal through the resistor 42b. The anode of the Zener diode 42a is grounded to the vehicle body through the resistor 42c. The collector of the transistor 42d is connected to the IG terminal through the resistor 42e. The emitter of the transistor 42d is grounded to the vehicle body. The base of the transistor 42d is connected to the node of the anode of the Zener diode 42a and one end of the resistor 42c. The Zener voltage of the Zener diode 42a and the resistances of the resistors 42b, 42c are set at such values that the voltage at this node reaches a value sufficiently large to turn on the transistor 42d when the output voltage of the battery 3 exceeds 14V.

The drive circuit 43 is constituted by the charge pump circuit 433, an oscillator circuit 430, a field current detector circuit 431, a current supply circuit 432, and an interrupter circuit 434.

The oscillator circuit 430, which is constituted by a high frequency oscillating circuit 430a, a low frequency oscillating circuit 430b, a NOT circuit 430c, and analog switches 430d, 430e, is for supplying the charge pump circuit 433 with one of two oscillation signals having different frequencies in accordance with a switching signal received from the field current detector circuit 431. The high frequency oscillating circuit 430a is a circuit for generating a periodic pulse signal having a rectangular wave that has a frequency of 800 kHz as one of the oscillation signals. The low frequency oscillating circuit 430b is a circuit for generating a periodic pulse signal having a rectangular wave that has a frequency of 400 kHz as the other of the oscillation signals. The analog switch 430e is connected at the control terminals thereof to the output terminal of the field current detector circuit 431 through the NOT circuit 430c, connected at the input terminal thereof to the output terminal of the low frequency oscillating circuit 430b, and connected at the output terminal thereof to the control terminal of the charge pump circuit 433. The analog switch 430d is connected at the control terminals thereof to the output terminal of the field current detector circuit 431, connected at the input terminal thereof to the output terminal of the high frequency oscillating circuit 430a, and connected at the output terminal thereof to the control terminal of the charge pump circuit 433.

The field current detector circuit 431, which is constituted by a FET 431a, a current detecting resistor 431b, a resistor 431c, a constant current source 431d, a comparator 431e, and a capacitor 431f, is for detecting the field current flowing through the field coil 20 and outputting the switching signal that takes a high or low level depending on the intensity of the field current to the analog switches 430d, 430e. The FET 431a is connected at the drain thereof to the B terminal through the resistor 431b, connected at the source thereof to the node of the one end of the field coil 20 and the source of the FET 40, and connected at the gate thereof to the gate of the FET 40, the output terminal of the charge pump circuit 433 and the drain of a FET 434a constituting the interrupter circuit 434. The resistor 431c is connected at one end thereof to the positive terminal of the battery 3 through the B terminal, and connected at the other end thereof to one terminal of the constant current source 431d the other end of which is grounded to the vehicle body. The comparator 431e is connected at the inverting input terminal thereof to the node of one end of the resistor 431c and the one terminal of the constant current source 431d, connected at the noninverting input terminal thereof to the node of one end of the resistor 431b and the drain of the FET 431a, connected at the output terminal thereof to the input terminal of the NOT circuit 430c and the control terminals of the analog switch 430d. The output terminal of the comparator 431e is also grounded to the vehicle body through the capacitor 431f.

The current supply circuit 432, which is constituted by a FET 432a, resistors 432b, 432e, 432g, 432i, and bipolar transistors 432c, 432d, 432f, 432h, is for supplying the charge pump circuit 433 with an electric current. The FET 432a is connected at the drain thereof to the node of the one end of the field coil 20 and the source of the FET 40 through the resistor 432b, connected at the source thereof to the collector of the transistor 432c which is grounded at the emitter thereof to the vehicle body, and connected at the gate thereof to the node of one end of the resistor 42e and the collector of the transistor 42d. The base of the transistor 432c is connected to the collector thereof and to the base of the transistor 432d which is connected at the collector thereof to the collector of the transistor 432f through the resistor 432e, and grounded at the emitter thereof to the vehicle body. The transistor 432f is connected at the emitter thereof to the B terminal through the resistor 432g, connected at the base thereof to the base of the transistor 432h. The base and collector of the transistor 432f are connected to each other. The transistor 432h is connected at the collector thereof to the input terminal of the charge pump circuit 433, connected at the emitter thereof to the node of the one end of the resistor 432g and the emitter of the transistor 432f. The bases of the transistors 432f, 432h are connected to the drain of the FET 42f of the control circuit 42 through the resistor 432i.

The charge pump circuit 433, which is constituted by diodes 433a to 433c, a NOT circuit 433d, and capacitors 433e, 433f, is for stepping up a voltage input thereto. The diodes 433a to 433c are connected in series. The capacitor 433e is connected at one terminal thereof to the output terminals of the analog switches 430d, 430e, connected at the other terminal thereof to the node of the cathode of the diode 433a and the anode of the diode 433b. The NOT circuit 433d is connected at the input terminal thereof to the output terminals of the analog switches 430d, 430e, and connected at the output terminal thereof to one terminal of the capacitor 433f the other terminal of which is connected to the node of the cathode of the diode 433b and the anode of the diode 433c.

The interrupter circuit 434, which is constituted by the FET 434a and a resistor 434b, is for interrupting the output of the charge pump circuit 433 by discharging the capacitors 433e, 433f of the charge pump circuit 433. The FET 434a is connected at the drain thereof to the cathode of the diode 433c and the gate of the FET 40 through the resistor 434b, connected at the gate thereof to the drain of the FET transistor 42f, and grounded at the source thereof to the vehicle body.

Next, the operation of the vehicle battery charging apparatus 1 having the above described structure is explained. The regulator 4 starts the voltage regulating operation when the ignition switch 5 is turned on. If the output voltage of the battery 3 falls below 14V, the voltage at the node of the anode of the Zener diode 42a and the one end of the resistor 42c becomes nearly 0V. In consequence, the transistor 42d is turned off. This causes the FETs 42f and 432a to turn on.

The turning on of the FET 432a causes the current mirror circuit constituted by the transistors 432c, 432d and the resistor 432b to start to operate. The turning on of the FET 42f allows a current to flow through the resistor 432i. This causes the current mirror circuit constituted by the transistors 432f, 432h and the resistor 432g to start to operate. As a result, the current supply circuit 432 starts supplying a current to the charge pump circuit 433.

The turning on of the FET 42f causes the FET 434a to be turned off. This causes the interrupter circuit 434 to stop interrupting the output of the charge pump circuit 433.

Thus, the charge pump circuit 433 starts the voltage step-up operation.

Since the current flowing through the FET 431a of the field current detector circuit 431, which is turned on and off in conjunction with the FET 40, is proportional to the field current flowing through the FET 40, the voltage drop across the current detecting resistor 431b represents the value of the field current. In this embodiment, the voltage at the node of the drain of the FET 431a and one end of the current detecting resistor 431b that represents the value of the field current is compared in the comparator 431e with a voltage at the node of the output terminal of the constant current source 431d and one end of the resistor 431c that represents a predetermined field current threshold. The field current threshold is set at a value which the field current takes when the vehicle generator is in a relatively low power output state. The switching signal which the comparator 431e outputs takes a low level when the voltage at the node of the drain of the FET 431a and the one end of the current detecting resistor 431b is not above the voltage at the node of the output terminal of the constant current source 431d and the one end of the resistor 431c, and otherwise takes a high level.

The oscillator circuit 430 outputs, thorough the analog switch 430d, the oscillation signal having the frequency of 800 kHz generated by the high frequency oscillating circuit 430a if the switching signal outputted from the comparator 431e is at the high level. On the other hand, the oscillator circuit 430 outputs, through the analog switch 430e, the oscillation signal having the frequency of 400 kHz generated by the low frequency oscillating circuit 430b if the switching signal outputted from the comparator 431e is at the low level.

The charge pump circuit 433 produces a voltage high enough to turn on the FET 40 by repeatedly performing the cycle of charging and discharging the capacitors 433e, 433f with the current supplied from the current supply circuit 432 in synchronization with the oscillation signal outputted from the oscillator circuit 430.

The vehicle generator 2 starts its electric power generating operation when the FET 40 is turned on to allow the field current to flow through the field coil 20. Thus, the battery 3 starts to be charged by the vehicle generator 2, and the output voltage of the battery 3 rises.

If the output voltage of the battery 3 exceeds 14V, the transistor 42d is turned on and the FET 42f is therefore turned off, because the voltage at the node of the anode of the Zener diode 42a and the one end of the resistor 42c becomes high enough to turn on the transistor 42d.

The turning on of the transistor 42d causes the FET 432a to be turned off. As a result, the current mirror circuit constituted by the transistors 432c, 432d and the resistor 432b stops its operation. Further, the turning off of the FET 42f interrupts the current supply to the resistor 432g and the transistors 432f, 432h. As a result, the current mirror circuit constituted by the transistors 432f, 432h and the resistor 432g stops its operation. Thus, the current supply circuit 432 stops supplying the current to the charge pump circuit 433.

The turning off of the FET 42f causes the FET 434a to be turned on. The turning on of the FET 434a causes electric charges accumulated in the capacitors 433e, 433f to be discharged to the vehicle body through the diodes 433b and 433c and the resistor 434b. As a result, the current supply circuit 432 stops supplying the current to the charge pump circuit 433.

Thus, the charge pump circuit 433 stops the voltage step-up operation. In consequence, the FET 40 is turned off, and accordingly the supply of the field current to the field coil 20 is interrupted. This stops the electric power generation by the vehicle generator 2. As a result, the output voltage of the battery 3 decreases as the battery 3 supplies electric power to electric loads.

Through these operations repeatedly performed by the regulator 4, the output voltage of the battery 3 is kept at 14 V. As explained above, in this embodiment, the regulator 4 is so configured as to lower the frequency of the oscillation signal supplied from the oscillator circuit 430 to the charge pump circuit 433 when the value of the field current is detected to be lower than the predetermined field current threshold.

Since the energy of a noise current increases with increase of its frequency, lowering the frequency of the oscillation signal reduces the energy of the noise current caused by charging and discharging the capacitors 433e, 433f.

Incidentally, lowering the frequency of the oscillation signal makes slower the rising speed of the output voltage of the charge pump circuit 433. This increases a power loss at the FET 40 in a transient state, however the power loss is small, because the lowering of the frequency of the oscillation signal takes place only when the field current flowing through the FET 40 is relatively small.

Second Embodiment

Figure 2:
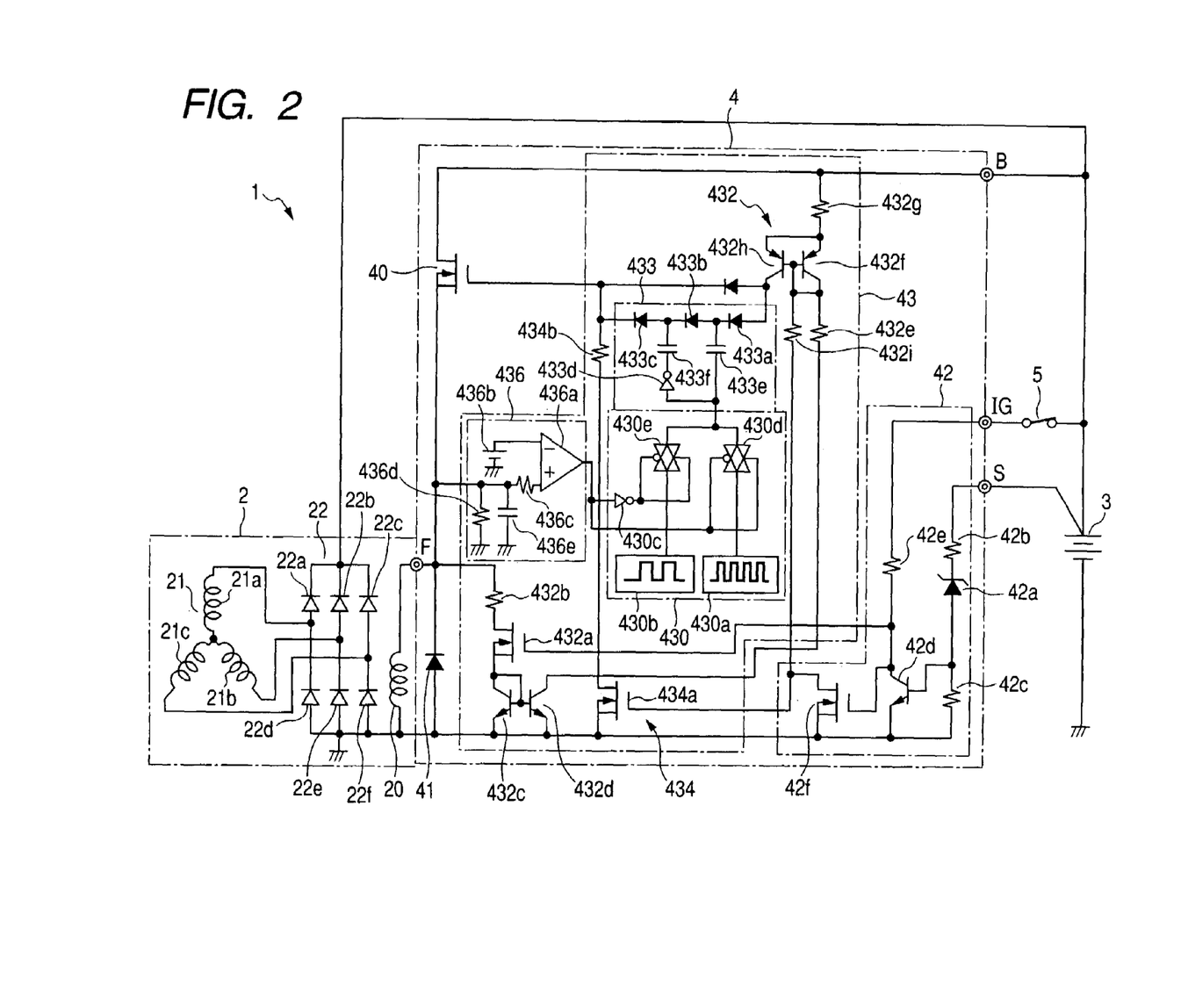
FIG. 2 is a circuit diagram of a vehicle battery charging apparatus including a vehicle generator regulating apparatus according to a second embodiment of the invention.

FIG. 2 is a circuit diagram of a vehicle battery charging apparatus 1 including a vehicle generator regulating apparatus according to a second embodiment of the invention. In FIG. 2, the elements that are the same as or corresponding to those in FIG. 1 are given the same reference numerals, and explanations thereof are omitted. As shown in FIG. 2, in the second embodiment, the drive circuit 43 is constituted by the oscillator circuit 430, an on-time measuring circuit 436, the current supply circuit 432, the charge pump circuit 433, and the interrupter circuit 434.

The on-time measuring circuit 436, which is constituted by a comparator 436a, a reference voltage source 436b, resistors 436c, 436d and a capacitor 436e, is for measuring, as an on-time, the duration of a time during which the FET 40 is in a conductive state, and outputting the switching signal having the high or low level depending on the length of the measured on-time. The inverting input terminal of the comparator 436a is connected to one terminal of the reference voltage source 436b the other terminal of which is grounded to the vehicle body. The noninverting input terminal of the comparator 436a is connected, through the resistor 436c, to the node of the source of the FET 40, one end of the field coil 20, one end of the resistor 436d the other end of which is grounded to the vehicle body, and one terminal of the capacitor 436e the other terminal of which is grounded to the vehicle body. The output of the comparator 436a is supplied as the switching signal to the oscillator circuit 430.

The below described explanation of the second embodiment is mainly directed to parts of the second embodiment not included in the first embodiment. The regulator 4 starts the voltage regulating operation when the ignition switch 5 is turned on. If the output voltage of the battery 3 falls below 14V, the transistor 42d is turned off, and the FET 42f is therefore turned on.

The turning off of the transistor 42d and the turning on of the FET 42f cause the current supply circuit 432 to start supplying a current to the charge pump circuit 433. The turning on of the FET 42f causes the interrupter circuit 434 to stop interrupting the output of the charge pump circuit 433.

Thus, the charge pump circuit 433 starts the voltage step-up operation.

While the FET 40 is in a conductive state, the voltage at the node of the source of the FET 40 and the one end of the field coil 20 is nearly equal to the output voltage of the battery 3. The voltage at this node is converted into a voltage whose level is in proportion to the measured on-time of the FET 40 by being integrated by the integration circuit constituted by the resistor 436d and the capacitor 436e.

The converted voltage is compared in the comparator 436a with a reference voltage which the reference voltage source 436b outputs as an on-time threshold. The on-time threshold is set at a value which the on-time of the FET 40 takes when the vehicle generator 2 is in a relatively low power output state. The switching signal which the comparator 436a outputs takes a low level when the converted voltage is not above the reference voltage, and otherwise takes a high level.

If the switching signal outputted from the comparator 436a is at the high level, the oscillator circuit 430 outputs, through the analog switch 430d, the oscillation signal having the frequency of 800 kHz generated by the high frequency oscillating circuit 430a. If the switching signal outputted from the comparator 436a is at the low level, the oscillator circuit 430 outputs, through the analog switch 430e, the oscillation signal having the frequency of 400 kHz generated by the low frequency oscillating circuit 430b.

The charge pump circuit 433 produces a voltage high enough to turn on the FET 40 by performing repeatedly the cycle of charging and discharging the capacitors 433e, 433f with the current supplied from the current supply circuit 432 in synchronization with the oscillation signal outputted from the oscillator circuit 430. The vehicle generator 2 starts the electric power generating operation when the FET 40 is turned on to allow the field current to flow through the field coil 20. Thus, the battery 3 starts to be charged by the vehicle generator 2, and accordingly the output voltage of the battery 3 rises.

As explained above, in the second embodiment, the regulator 4 is so configured as to lower the frequency of the oscillation signal supplied from the oscillator circuit 430 to the charge pump circuit 433 when the measured on-time of the FET 40 is detected to be not longer than the on-time threshold. As is the case with the first embodiment, the second embodiment offers the advantage that the energy of the noise caused by charging and discharging the capacitors 433e, 433f can be reduced by lowering the frequency of the oscillation signal.

As already explained, lowering the frequency of the oscillation signal increases a power loss at the FET 40 in a transient state, however, the power loss is small, because the lowering of the frequency of the oscillation signal takes place only when the on-time of the FET 40 is relatively short and the field current flowing through the FET 40 is therefore relatively small.

Third Embodiment

Figure 3:
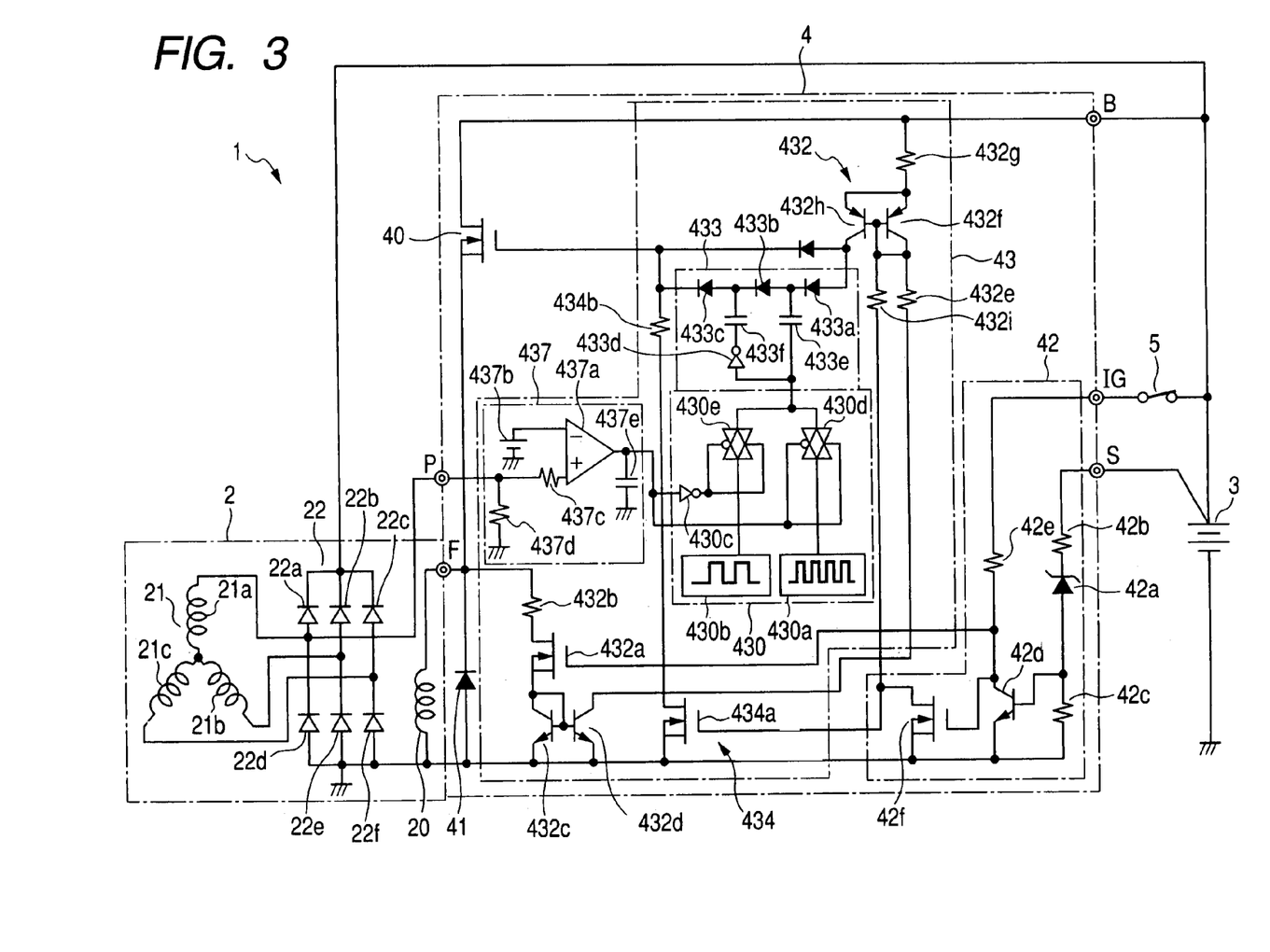
FIG. 3 is a circuit diagram of a vehicle battery charging apparatus including a vehicle generator regulating apparatus according to a third embodiment of the invention.

FIG. 3 is a circuit diagram of a vehicle battery charging apparatus 1 including a vehicle generator regulating apparatus according to a third embodiment of the invention. In FIG. 3, the elements that are the same as or corresponding to those in FIG. 1 or FIG. 2 are given the same reference numerals, and explanations thereof are omitted.

As shown in FIG. 3, in the third embodiment, the drive circuit 43 is constituted by the oscillator circuit 430, an induced voltage detector circuit 437, the current supply circuit 432, the charge pump circuit 433, and the interrupter circuit 434.

The induced voltage detector circuit 437, which is constituted by a comparator 437a, a reference voltage source 437b, resistors 437c, 437d, and a capacitor 437e, is for detecting an induced voltage across the stator coil 21, and outputting the switching signal having the high or low level depending on the detected induced voltage. The inverting input terminal of the comparator 437a is connected to one terminal of the reference voltage source 437b the other terminal of which is grounded to the vehicle body. The noninverting input terminal of the comparator 437a is connected to the node of one end of the phase coil 21a of the stator coil 21, the anode of the diode 22a, and the cathode of the diode 22d through the resistor 437c. The resistor 437c is connected between the vehicle body and one end of the resistor 437c the other end of which is connected to the noninverting terminal of the comparator 437a. The output terminal of the comparator 437a, which is grounded to the vehicle through the capacitor 437e, is connected to the control terminal of the oscillator 430.

Next, the operation of the vehicle battery charging apparatus 1 having the above described structure is explained below. This explanation of the third embodiment is mainly directed to the parts thereof not included in the first embodiment. The regulator 4 starts the voltage regulating operation when the ignition switch 5 is turned on. If the output voltage of the battery 3 falls below 14V, the transistor 42d is turned off, and the FET 42f is therefore turned on.

The turning off of the transistor 42d and the turning on of the FET 42f cause the current supply circuit 432 to start supplying a current to the charge pump circuit 433. The turning on of the FET 42f causes the interrupter circuit 434 to stop interrupting the output of the charge pump circuit 433.

Thus, the charge pump circuit 433 starts the voltage step-up operation.

The induced voltage across the stator coil 21 is rectified by the rectifier circuit 22. The induced voltage rectified by the rectifier circuit 22 is compared with the reference voltage which the reference voltage source 437b outputs as an induced voltage threshold. The induced voltage threshold is set at a value which the induced voltage across the stator coil 21 takes when the vehicle generator is in a relatively low power output state. The switching signal which the comparator 437a outputs takes the low level when the rectified induced voltage is not above the reference voltage, and otherwise takes the high level.

If the switching signal outputted from the comparator 437a is at the high level, the oscillator circuit 430 outputs, thorough the analog switch 430d, the oscillation signal having the frequency of 800 kHz generated by the high frequency oscillating circuit 430a. If the switching signal outputted from the comparator 437a is at the low level, the oscillator circuit 430 outputs, through the analog switch 430e, the oscillation signal having the frequency of 400 kHz generated by the low frequency oscillating circuit 430b.

The charge pump circuit 433 produces a voltage high enough to turn on the FET 40 by performing repeatedly the cycle of charging and discharging the capacitors 433e, 433f with the current supplied from the current supply circuit 432 in synchronization with the oscillation signal outputted from the oscillator circuit 430. The vehicle generator 2 starts the electric power generating operation when the FET 40 is turned on to allow the field current to flow through the field coil 20.

As explained above, in this third embodiment, the regulator 4 is so configured as to lower the frequency of the oscillation signal supplied from the oscillator circuit 430 to the charge pump circuit 433 when the induced voltage across the stator coil 21 is detected to be not above the induced voltage threshold. The third embodiment offers the same advantage provided by the first and second embodiments that the energy of the noise caused by charging and discharging the capacitors 433e, 433f can be reduced by lowering the frequency of the oscillation signal.

As in the case of the first and second embodiments, lowering the frequency of the oscillation signal increases a power loss at the FET 40 in a transient state, however the power loss is small, because the lowering of the frequency of the oscillation signal takes place only when the induced voltage is relatively small and the field current flowing through the FET 40 is therefore relatively small.

Figure 4:
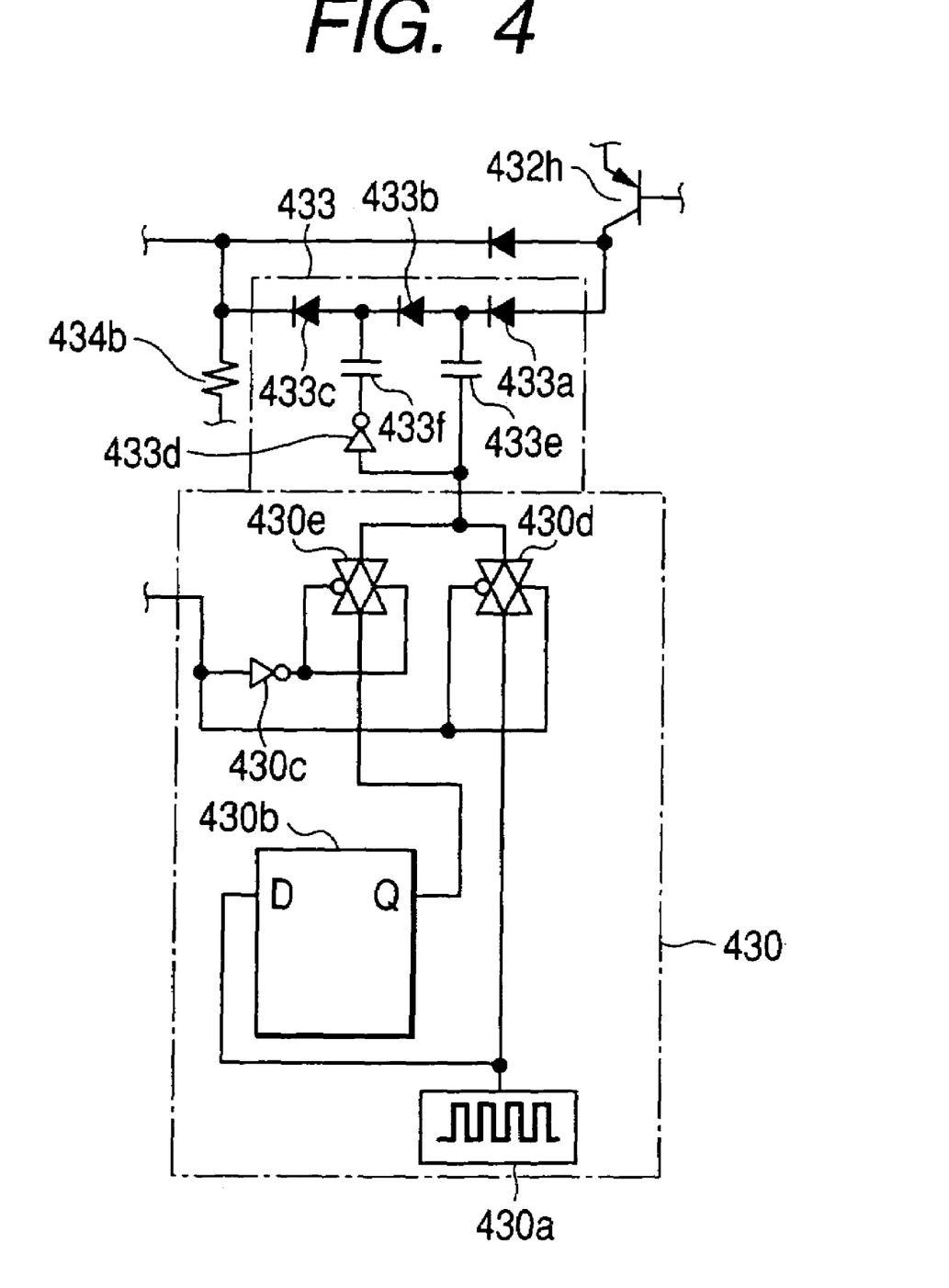
FIG. 4 is a circuit diagram of an oscillator circuit usable for the vehicle generator regulating apparatus of the invention.

Although the vehicle battery charging apparatuses according to the first to third embodiments have the high frequency oscillating circuit 430a and the low frequency oscillating circuit 430b which operate independently, a D flip-flop that frequency-divides the oscillation signal generated by the high frequency oscillating circuit 430a to produce the oscillation signal having the frequency of 400 kHz may be used instead of the low frequency oscillating circuit 430b to simplify the structure of the oscillator circuit.

Furthermore, in the first to third embodiments, although the regulator 4 is so configured as to switch the frequency of the oscillation signal used to drive the charge pump circuit between two different values depending on the power generating state of the vehicle generator, it may be so configured as to switch the frequency of the oscillation signal between three or more different values depending on the power generating state of the vehicle generator.

The above explained preferred embodiments are exemplary of the invention of the present application which is described solely by the claims appended below. It should be understood that modifications of the preferred embodiments may be made as would occur to one of skill in the art.

What is claimed is:

1. A vehicle generator regulating apparatus comprising:
   a switching device operating to allow a field current to flow into a field coil of said vehicle generator from a battery being charged by said vehicle generator when said switching device is applied with a voltage signal;
   a drive circuit applying said voltage signal to said switching device when said drive circuit is supplied with a control signal; and
   a control circuit detecting an output voltage of said battery and supplying said control signal to said drive circuit when said output voltage is detected to be not above a predetermined voltage;
   said drive circuit including a charge pump circuit stepping up a DC voltage supplied from said battery to generate said voltage signal by repeatedly performing a cycle of charging and discharging a plurality of capacitors in synchronization with an oscillation signal, and an oscillator circuit supplying said oscillation signal to said charge pump circuit,
   said drive circuit being configured to lower a frequency of said oscillation signal when said vehicle generator is in a low power output state.

2. A vehicle generator regulating apparatus according to claim 1, wherein said drive circuit includes a field current detector circuit detecting an intensity of said field current, said drive circuit being configured to lower said frequency of said oscillation signal when said field current detector circuit detects that said intensity of said field current is not above a predetermined intensity.

3. A vehicle generator regulating apparatus according to claim 2, wherein said oscillator circuit includes a first oscillating circuit generating a first periodic pulse signal having a first frequency, and a second oscillating circuit generating a second periodic pulse signal having a second frequency lower than said first frequency, said oscillator circuit being configured to supply said second periodic pulse signal to said charge pump circuit as said oscillation signal when said field current detector circuit detects that said intensity of said field current is not above said predetermined intensity.

4. A vehicle generator regulating apparatus according to claim 3, wherein said second oscillating circuit includes a frequency-divider circuit which frequency-divides said first periodic pulse signal to produce said second periodic pulse signal.

5. A vehicle generator regulating apparatus according to claim 1, wherein said drive circuit includes an on-time measuring circuit which measures, as an on-time, a duration of a time during which said switching device is in an on state where said field current is allowed to flow into said field coil, said oscillator circuit being configured to supply said second periodic pulse signal to said charge pump circuit as said oscillation signal when said on-time measuring circuit detects that said on-time is not longer than a predetermined time.

6. A vehicle generator regulating apparatus according to claim 4, wherein said oscillator circuit includes a first oscillating circuit generating a first periodic pulse signal having a first frequency, and a second oscillating circuit generating a second periodic pulse signal having a second frequency lower than said first frequency, said oscillator circuit being configured to supply said second periodic pulse signal to said charge pump circuit as said oscillation signal when said on-time measuring circuit detects that said on-time is not longer than said predetermined time.

7. A vehicle generator regulating apparatus according to claim 6, wherein said second oscillating circuit includes a frequency-divider circuit which frequency-divides said first periodic pulse signal to produce said second periodic pulse signal.

8. A vehicle generator regulating apparatus according to claim 1, wherein said drive circuit includes an induced voltage detector circuit which detects a voltage induced across said stator coil, said drive circuit being configured lower said frequency of said oscillation signal when said induced voltage detector circuit detects that a value of said voltage induced across said stator coil is not larger than a predetermined value.

9. A vehicle regulator regulating apparatus according to claim 8, wherein said oscillator circuit includes a first oscillating circuit generating a first periodic pulse signal having a first frequency, and a second oscillating circuit generating a second periodic pulse signal having a second frequency lower than said first frequency, said oscillator circuit being configured to supply said second periodic pulse signal to said charge pump circuit as said oscillation signal when said induced voltage detector circuit detects that said value of said induced voltage is not larger than said predetermined value.

10. A vehicle generator regulating apparatus according to claim 9, wherein said second oscillating circuit includes a frequency-divider circuit which frequency-divides said first periodic pulse signal to produce said second periodic pulse signal.

* * * * *